E. R. CALTHROP.
PARACHUTE.
APPLICATION FILED JULY 15, 1919.
1,353,378.
Patented Sept. 21, 1920.
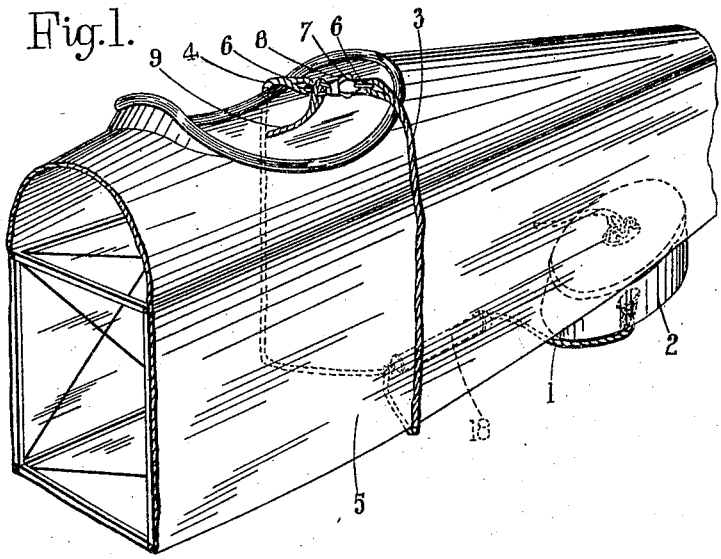
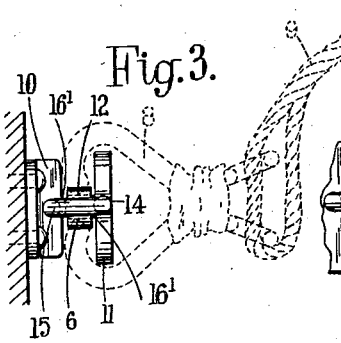
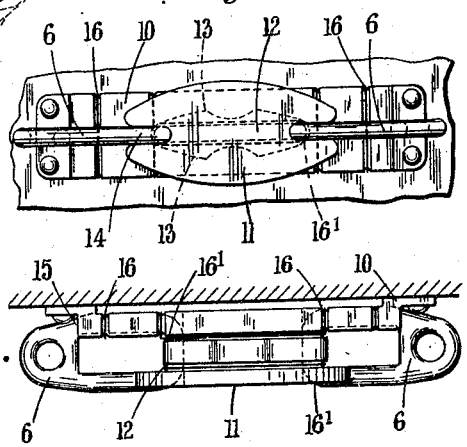
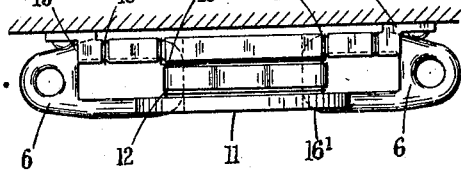
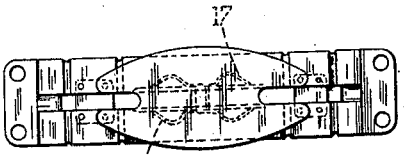
Everard Richard Calthrop
INVENTOR
by his Attorney

UNITED STATES PATENT OFFICE.

EVERARD RICHARD CALTHROP, OF LONDON, ENGLAND, ASSIGNOR TO E. R. CALTHROP'S AERIAL PATENTS LIMITED, OF LONDON, ENGLAND.

PARACHUTE.

1,353,378.  Specification of Letters Patent.  Patented Sept. 21, 1920.

Application filed July 15, 1919. Serial No. 311,101.

*To all whom it may concern:*

Be it known that I, EVERARD RICHARD CALTHROP, a subject of the King of Great Britain, residing at London, in the county of Middlesex, England, have invented new and useful Improvements Relating to Parachutes, of which the following is a specification.

My invention has reference to parachutes such as are carried in a packed or nested condition on under or in the fuselage of an aeroplane, and adapted to be launched therefrom by the application of the load.

In parachutes of this kind a rope or sling is provided which is secured respectively to the parachute and to the harness worn by the aviator, said rope being led up one side of the fuselage. With this arrangement it is obvious that when a descent is to be made the aviator must necessarily throw himself from that side of the cockpit upon which the parachute rope is positioned. It is however not always feasible or convenient to do this, as it may happen in an emergency which necessitates a descent that the aeroplane, at that moment, occupies a position rendering it difficult, or may be impossible, for the aviator to extricate himself with sufficient rapidity.

Now it is the primary object of the present invention to provide improved means for obviating this difficulty, and to construct a sling for connecting the parachute to the aviator which will admit of him descending from either side of the machine with equal facility, irrespective of the position of the machine at the moment when he is about to commence his descent.

In the accompanying drawings—

Figure 1 is a perspective view of a portion of an aeroplane fuselage illustrating the application of my invention thereto.

Fig. 2 represents a front elevation of a device, embodying this invention, adapted to connect the parachute sling with the aviator's harness.

Fig. 3 is an end elevation of the same and Fig. 4 a plan view.

Fig. 5 represents a plan view of a slightly modified construction of the device shown in Fig. 2.

In carrying my invention into effect I provide a sling which is of Y shaped formation, the single member or limb 1 thereof being adapted for attachment to the parachute 2, while the two branching members or limbs 3 and 4 are adapted to be arranged one upon each side of the fuselage 5 as shown in Fig. 1. The ends of said branching members are each provided with an eye 6, which is retained by a device indicated as a whole in Fig. 1 by the numeral 7 attached to a convenient part of the cockpit such as behind the pilot's seat, which device serves to retain an appropriate member, such as a dog-hook 8 which forms the termination of the rope 9, which is secured to the aviator's harness as will be well understood by those familiar with the art to which this invention relates.

The aforesaid device 7 comprises a member substantially H shaped in cross section, consisting of a rear plate 10 and a front plate 11, connected by the bar 12 which, in the construction shown in Fig. 2, is provided on its upper and lower surfaces with depressions 13, the purpose of which will presently appear. The front plate 11 is formed with recesses or slots 14, and the rear plate 10 is also formed with undercut recesses 15 which, with the slots 14, provide a housing in which the eyes 6, positively secured to the ends of the branching members 3 and 4 of the aforesaid sling, are frictionally engaged.

Referring now more particularly to Figs. 1 and 3, the rope 9 which, as above stated is connected to the usual aviator's harness, is provided with a dog hook 8 the jaws of which are opened and clipped over the bar 12, the ends of the jaws resting in the depressions 13 in said bar.

It will thus be seen that when parts are in the positions described, the two eyes 6 at the ends of the branching limbs 3 and 4 of the sling are so held that, the dog hook 8 lies between them, the jaws of said hook being held apart by the bar 12.

In operation my improved arrangement acts as follows: The bifurcated sling being attached by its single member or limb 1 to the parachute 2, the branching members 3 and 4 are arranged one on each side of the fuselage, and the eyes 6 engaged in the device 7, which is attached to the cockpit, said eyes being preferably held in position in their housings by rupturable cords 16 and 16' to prevent accidental displacement. The dog-hook 8 secured to the rope 9 is then clipped over the bar 12 between the eyes 6. The parts are now in position for immediate operation in case of emergency, and when the aviator throws himself from either side of the cockpit the dog hook 8 will be dragged to that side, and engage and instantly snap into, the eye 6 attached to that one of the branching limbs 3 or 4 of the sling which is also to the same side, thereby positively connecting the rope 9 and sling together. The weight of the load snaps the rupturable cords 16 and 16' thus freeing the disengaged eye 6, and allowing of the unimpeded fall of the aviator, until his weight is exerted upon the parachute, thereby launching the latter.

In the modified construction of the device illustrated in Fig. 5, the bar 12 instead of being formed with depressions 13 to receive the ends of the jaws of the dog hook 8 is provided with spring members 17 for a like purpose. The operation however is identical with that first described, and therefore needs no further explanation here.

It will of course be understood that a suitable shock absorber device indicated diagrammatically at 18 in Fig. 1 is preferably interposed in the single limb 1 of the aforesaid sling, but as such shock absorbers are in general use with the various life saving parachutes invented by me it forms no part of the present invention *per se*.

I claim:

1. A device for connecting an aviator with a parachute comprising a bifurcated sling adapted for attachment to a parachute, means for holding the bifurcated ends of said sling in operative relation with the end of the rope attached to the load, and means whereby upon application of the load said load is automatically connected with one of the bifurcated ends of said sling while the other end thereof is freed.

2. A device for connecting an aviator with a parachute comprising a member substantially H shaped in cross section adapted to hold eyes, attached to the two ends of a bifurcated sling, in operative relation with a dog-hook secured to the rope attached to the load, in such a manner that on application of the load said dog-hook will be caused to engage one or other of said eyes.

EVERARD RICHARD CALTHROP.